(No Model.)

E. A. WALL.
ORE CONCENTRATOR.

No. 380,233.          Patented Mar. 27, 1888.

Witnesses
T. W. Fowler
N. H. Patterson

Inventor.
Enos A. Wall,
By his Attorneys,
A. H. Evans & Co.

UNITED STATES PATENT OFFICE.

ENOS A. WALL, OF SALT LAKE CITY, UTAH TERRITORY.

ORE-CONCENTRATOR.

SPECIFICATION forming part of Letters Patent No. 380,233, dated March 27, 1888.

Application filed April 12, 1887. Serial No. 234,520. (No model.)

*To all whom it may concern:*

Be it known that I, ENOS A. WALL, a citizen of the United States, residing at Salt Lake City, in the county of Salt Lake and Territory of Utah, have invented certain new and useful Improvements in Ore-Concentrators, of which the following is a full, clear, and exact description, reference being had to the accompanying drawings, forming part of this specification, in which—

Figure 1:
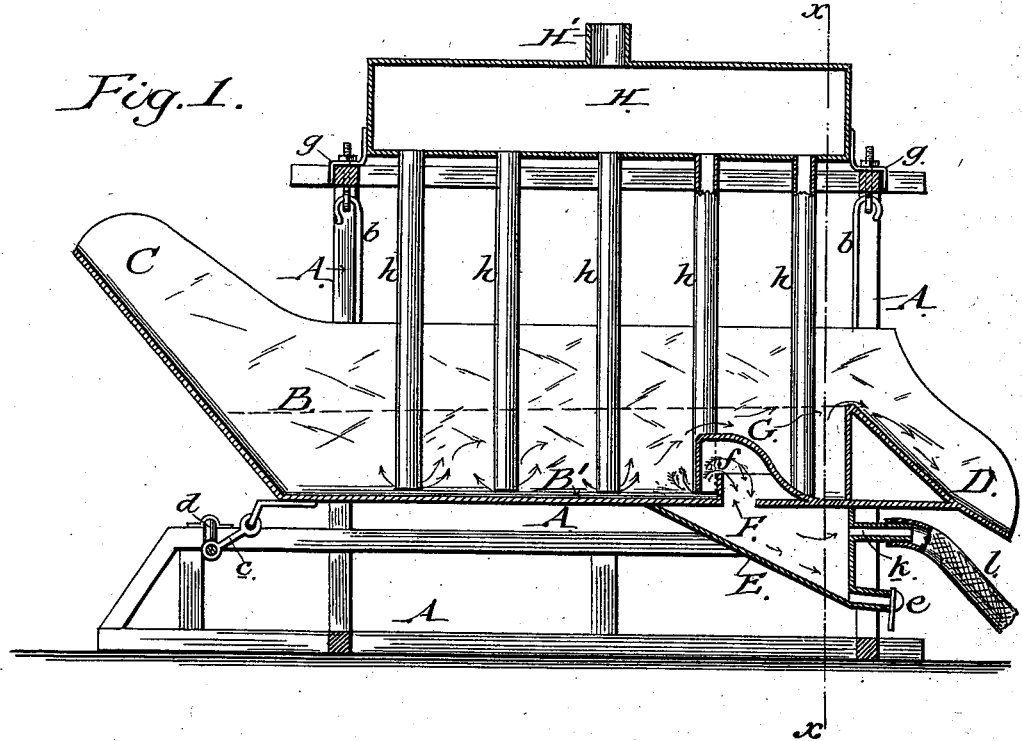
Figure 2:
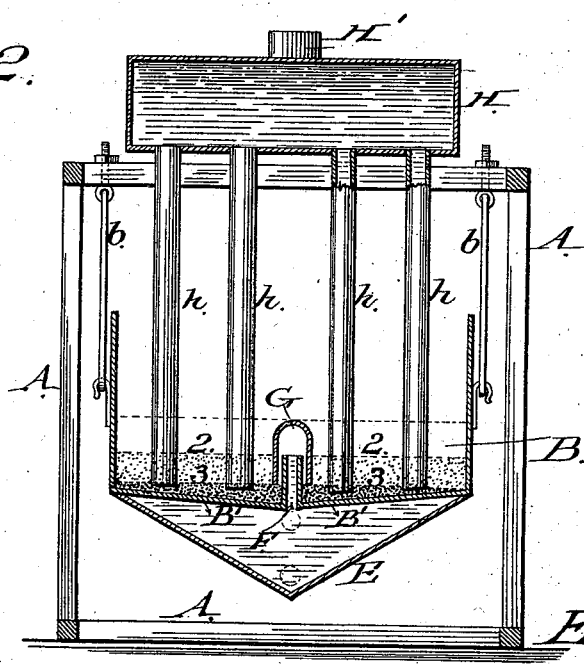

Figure 1 represents a longitudinal sectional view of an ore-concentrator embodying my invention. Fig. 2 is a cross-sectional view of the same on the line *x x* of Fig. 1.

My present invention relates to certain improvements in machines for concentrating valuable ores; and it consists in the peculiar constructions and combinations of parts, which I shall hereinafter fully describe and claim.

To enable others skilled in the art to which my invention appertains to make and use the same, I will now describe its construction and indicate the manner in which the same is carried out.

In the said drawings, A indicates a suitable frame, within which the pan or receptacle B is suspended by means of adjustable links *b*, connected therewith and with the main frame of the machine, the usual vibrating motion being imparted to the pan or receptacle by means of a link or rod, *c*, connecting said pan with a crank-shaft, *d*, suitably journaled in the frame A, as shown.

The pan or receptacle B is provided at one end with an inlet, C, for the introduction of the material, and at the opposite end with an overflow, D, the position of which may be adjusted—*i. e.*, raised or lowered—when desired by adjusting the links *b*, the said overflow being provided when necessary with gates, whereby the discharge of the waste material at any stage of the operation may be regulated to suit circumstances.

The bottom B' of the receptacle inclines slightly from the sides to the center and has secured thereto a chamber or reservoir, E, having inclined bottom and rear portion and vertical front portion and into which the dressed ores pass and from which they are drawn by means of a faucet, *e*. The bottom B' has an opening, F, communicating with the reservoir, and this opening is inclosed by vertical walls or plates *f*, forming a bridge, over which the ore in the pan A must pass before it reaches the reservoir, the said bridge being in turn protected or inclosed by a curved guard, G, which is arched over its upper end and has its side portions projecting downward to within a short distance of the bottom of the pan.

Supported upon the main frame by suitable arms or brackets, *g*, is a reservoir, H, containing water under pressure and having depending from its under surface a number of small tubes, *h*, which reach nearly to the bottom of the pan A and serve as mediums for conveying the water in reservoir H to the ore to be treated, the said reservoir having an inlet-pipe, H', which communicates with any suitable water-supply.

A practical experiment has developed the fact that a machine constructed as herein set forth is a perfect success.

The reservoir, as before stated, is provided with a faucet through which the ores are discharged. An upper tube, *k*, let into the front wall of the reservoir, is for the introduction, by means of a hose, *l*, of a column of water under pressure sufficient to overcome the column of water in the pan above, and thus prevent the water from flowing down through the pan with the ore, which would create a suction and carry down waste material with said ore when the latter is discharged. If an excess of water be thus injected—*i. e.*, more than could pass out of the open gate *e* with the ore—it would pass up over the bridge into the pan and mingle with the water-supply from above, but would not obstruct the discharge of ore or successful working of the machine. This flushing-pipe, as before indicated, has a hose-connection, so as to admit of vibration with the motion of the pan. The size of the tubes and pressure of water will be controlled by size and weight of mineral particles to be treated.

The water chest or reservoir H must be secured to the frame-work A, so that the pipes *h* shall remain fixed, while the pan B, with its contents, is rapidly moved to and fro. The pipes will then have the effect of stirring the pulp as it is moved against them by the motion of the pan, and thus contribute to the effect of settling and separating the heavier particles from the lighter. It is evident that with the vibrating motion of the pan and the stirring and agitating effect of the water jets and pipes the heavier particles will rapidly settle to the bottom—i. e., onto the bed indicated by dotted lines 2—(which is introduced or allowed to accumulate before the valve e is opened,) and as this bed is increased by the addition of mineral particles from ores being treated an amount equal to the increase will be continuously discharged from the bed and will rise inside of the guards correspondingly to the accumulation outside of the same; but only that portion of the bed near the bottom—i. e., beneath dotted line 3—will pass out over plates f f. Thus it will be seen that the heaviest (or lower) portions of the ore can pass out and that the lighter or waste material must be forced out at the discharge D.

The height of the overflow or discharge must be such as to cause the waste material to pass out and not allow a sufficient accumulation of lighter material on the ore-bed to crowd said bed out, as in that case the waste material would follow in the direction of the latter. This is easily prevented by raising or lowering the point of overflow, and thereby controlling the depth and weight of waste material on top of the bed 2, care being taken at first to place the point of overflow low enough, so that it can be afterward raised.

Having thus described my invention, what I claim as new, and desire to secure by Letters Patent, is—

1. The combination, with the main frame, the vibrating pan or receptacle suspended therein having a bottom inclining from the sides toward the center, of the underlying chamber E, communicating with said pan and having an inclined bottom and rear portion, a water-tank having tubes depending into the body of ore in said pan, a valve, e, and a flushing-pipe leading into the chamber E through its front wall, substantially as herein described.

2. The combination of the main frame, the suspended vibrating pan having an inlet at one end and an overflow at the opposite end, a water-tank having tubes entering the ore in said pan, a chamber beneath the pan and communicating with the same through an opening in the latter and provided with a discharge-valve, a curved guard inclosing said opening, and a flushing-pipe entering the front wall of the chamber, substantially as herein described.

ENOS A. WALL.

In presence of—
EDWARD B. CRITCHLOW,
A. J. WHITE.